March 17, 1925.
C. L. FOSTER
1,529,781
WEEDING TOOL
Filed Feb. 28, 1923
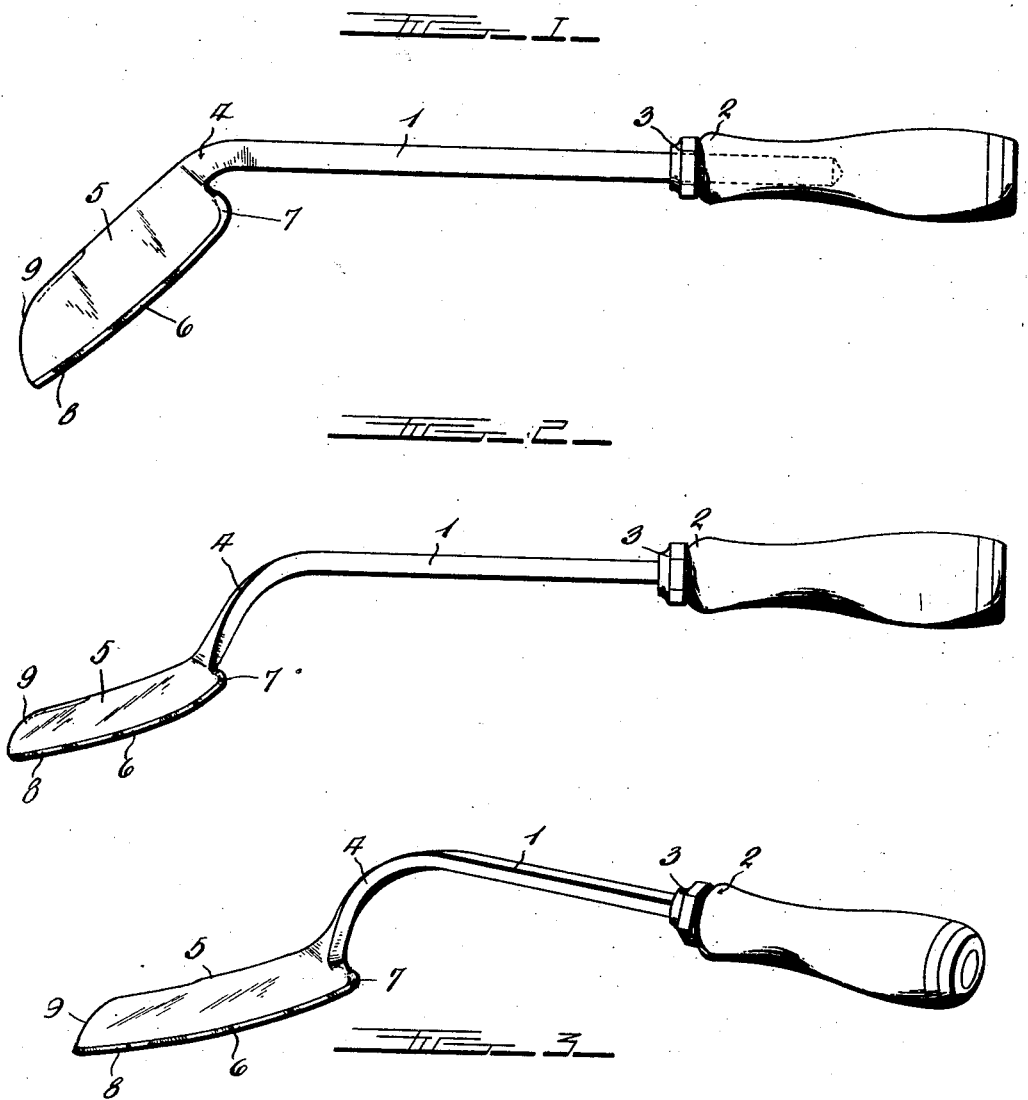

Patented Mar. 17, 1925.

1,529,781

UNITED STATES PATENT OFFICE.

CHARLES L. FOSTER, OF SEDGWICK, KANSAS.

WEEDING TOOL.

Application filed February 28, 1923. Serial No. 621,899.

*To all whom it may concern:*

Be it known that I, CHARLES L. FOSTER, a citizen of the United States of America, residing at Sedgwick, in the county of Harvey, State of Kansas, have invented certain new and useful Improvements in Weeding Tools; and I do hereby declare that the following is a full, clear, concise, and exact description of the invention, such as will enable others skilled in the art to which it appertains to make and use the same.

This invention relates to improvements in gardening implements having for an object to provide a weeding tool of such formation as will enable a person employing the same to effectually and rapidly cut weeds or other growths with but minimum effort, the arrangement of the cutting edge of the blade with relation to the handle or shank of the tool being at such an angle as to, when the same is moved into engagement with matter to be cut, produce a downwardly directed shearing cut, thus cleanly severing the stalks of the matter and likewise, causing the blade to be moved therethrough with the least possible resistance.

It is also an object of the invention to provide a weeding tool wherein the cutting blade and handle shank are formed in one piece, the blade being bent at the proper angle with relation to the shank, thus lending to the stability and rigidity of the tool.

Other objects will be in part obvious and in part pointed out hereinafter.

In order that the invention and its mode of operation may be readily understood by persons skilled in the art, I have in the accompanying illustrative drawings, and in the detailed following description based thereon, set out one possible embodiment of the same.

In these drawings:—

Figure 1 is a top plan view of the improved tool;

Figure 2 is a side elevation thereof; and,

Figure 3 is a perspective view of the tool.

Having more particular reference to the drawings, in connection with which like characters of reference will designate corresponding parts throughout, the improved tool may be stated to comprise an elongated tool metal shank 1 having one end thereof threaded to receive a suitable handle 2 secured in position by means of a lock nut 3. The opposite end of the tool metal shank 1 is twisted upon itself and bent downwardly as indicated at 4 whereupon it is formed with a cutting blade designated by the numeral 5, said blade being arranged in a plane nearer to that in which the tool shank 1 is arranged, but being disposed at an obtuse angle with respect thereto as clearly indicated in the Figure 1. Furthermore, the cutting blade 5 is arranged at a slight downward incline, whereby when the same is drawn through matter to be cut, a downwardly directed shearing cut will be effected. This downwardly directed shearing cut, as will be understood, will be caused by the obtuse angle at which the cutting blade 5 is arranged with respect to the body portion of the tool shank 1 and likewise, by the downwardly inclined positioning of the same, that is, the blade 5 slightly deviating from the plane in which the tool shank 1 is arranged, as indicated in the Figure 2.

The cutting edge 6 of the blade 5 is of substantially bow-shaped formation, the rearward portion of the same curving rather acutely about the inner sides and end portions of the blade 5 as indicated at 7, while the outer portion of the cutting edge is of a more gradual curvature as is clearly indicated by the numeral 8, meeting the outer end of the cutting blade approximately medially and providing thereby a tapered outer end upon the cutting blade whereby the same may be readily engaged in thickly weeded places; the rearward outer end portion of the cutting blade being also curved as indicated by the numeral 9 whereby to complete such tapered formation of the outer end of the blade 5.

As hereinbefore stated, due to the angle at which the cutting blade 5 is arranged with respect to the tool shank 1, it will be understood that when the handle 2 is grasped in the hand of a user, and the tool is moved with a sweeping motion, or a direct pulling movement, the bow shaped cutting edge 6 will engage with the matter to be severed and effect a downwardly directed shearing cut therethrough, hence, offering the least possible resistance to the passage of the cutting blade applied thereto and likewise, effecting a clean cut through the matter.

Manifestly, the construction shown is capable of considerable modification and such modification as is within the scope of my claims, I consider within the spirit of my invention.

I claim:

A weeding tool comprising an elongated shank having a handle arranged on one end thereof, the opposite end of said shank being twisted upon itself and bent at substantially right angles, and a cutting blade integral with the free end of the angularly bent portion of said shank and disposed at a wide obtuse angle thereto, said cutting blade being arranged at an obtuse angle with respect to the body portion of the shank and having a curved cutting edge formed upon one side thereof, the inner end of which is curved acutely about the inner end of the blade while the outer portion of such cutting edge is curved gradually over the blade.

In witness whereof I have hereunto set my hand.

CHARLES L. FOSTER.